UNITED STATES PATENT OFFICE.

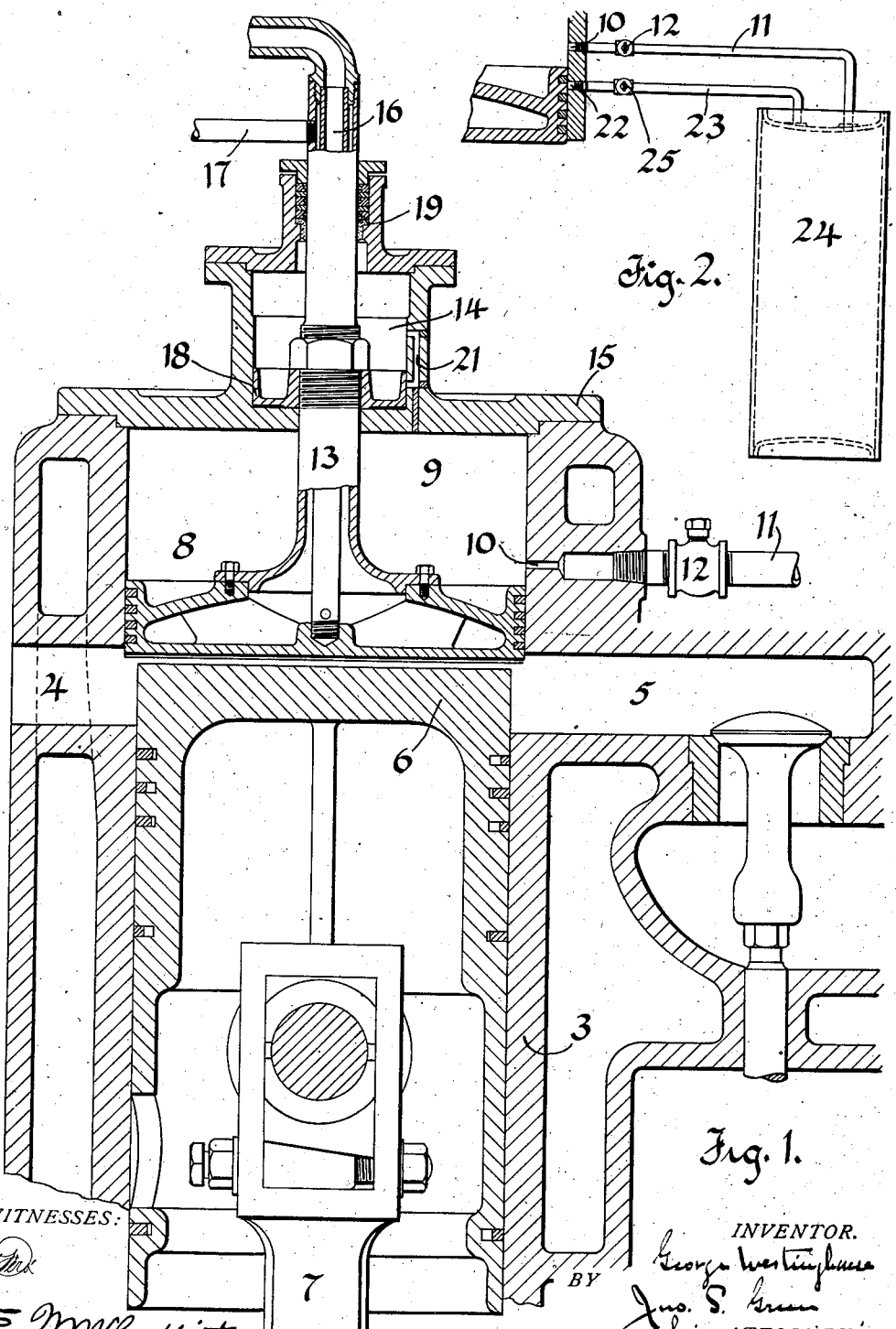

GEORGE WESTINGHOUSE, OF PITTSBURG, PENNSYLVANIA.

INTERNAL-COMBUSTION ENGINE.

No. 906,177.     Specification of Letters Patent.     Patented Dec. 8, 1908.

Application filed February 12, 1907. Serial No. 357,078.

*To all whom it may concern:*

Be it known that I, GEORGE WESTINGHOUSE, a citizen of the United States, and a resident of Pittsburg, in the county of Allegheny and State of Pennsylvania, have made a new and useful Invention in Internal-Combustion Engines, of which the following is a specification.

This invention relates to internal combustion engines and has for an object the production of an engine which, in accordance with the power delivered, is relatively cheap to build.

A further object is the production of an engine in which means are employed for maintaining a substantially constant pressure during the operation of the engine and for limiting the ultimate explosion pressure.

A further object is the production of means in connection with an engine cylinder whereby the cylinder and the coöperating parts are relieved of the excessive strains ordinarily encountered during the explosion or expansion, but in which all the available energy, rendered kinetic by the explosion, is effectively delivered to the engine piston.

These and other objects I attain in an engine embodying the features herein described and illustrated.

In the drawings accompanying this application and forming a part thereof: Figure 1 is a partial sectional elevation of an engine embodying my invention; and Fig. 2 illustrates diagrammatically a detail of my invention.

In carrying out my invention I provide each engine cylinder with a variable combustion chamber which automatically accommodates itself to the existing conditions and maintains within the engine a substantially constant compression, no matter how much charge is admitted to the engine cylinder. I accomplish this by providing at the compression end of the cylinder a fluid pressure restrained piston which is so located and arranged with reference to the engine piston that any charge admitted to the engine cylinder will force it, during the compression stroke, backwards in opposition to the restraining pressure and thereby increase the volume of the explosion chamber in accordance with the amount of charge admitted, and maintain within the cylinder a substantially constant compression. The fluid restrained piston is moreover so arranged that it will recede and further increase the volume of the explosion chamber during the time it is exposed to the expansion or explosion pressure. The engine cylinder and the coöperating parts of an engine operating under such conditions will never be subjected to the excessively high stresses that are ordinarily encountered during the explosion stroke for the reason that the combustion chamber will automatically increase to a size proportionate to the amount of energy developed in the engine cylinder and will therefore limit the explosion pressure and keep it down to a pressure substantially equal to the ultimate compression pressure. The fluid restrained piston will, in receding under the impulse given to it by either the compression or explosion pressure, compress the restraining fluid a certain amount and therefore abstract energy from the engine cylinder. This energy, however, is paid back by the expansion of the restraining fluid after the pressure within the engine cylinder has decreased below the pressure of the restraining fluid.

I am aware that various methods of obtaining these results have been tried, but to my knowledge none were successful, principally for the reason that the apparatus employed was faulty and introduced difficulties that I propose to overcome by my improved apparatus.

Referring to the drawings, an engine cylinder 3 is provided with an admission port 4, an exhaust port 5 and a piston 6, which is provided with a suitable connecting rod 7. A supplemental or auxiliary piston 8 is located in a cylindrical chamber 9 which is provided at the compression end of the engine cylinder. The piston 8 is made as light as possible for the purpose of reducing its inertia and is adapted to recede, under the influence of the compression and explosion pressure in the engine cylinder, into the chamber 9, against the pressure of a restraining fluid which is delivered to the chamber through a port 10. The port 10 communicates, through piping 11, with a source of fluid supply of sufficient size to take care of the fluid leakage from the chamber 9 and to maintain within the chamber 9, behind the piston 8, the desired amount of fluid pressure. The piping 11 is provided with a reducing valve 12 which is adapted to proportion the degree of pressure admitted to the chamber 9.

The piston 8 is hollow and is provided with a hollow stem 13 which extends through a dash pot 14, located on the head 15 of the chamber 9, and which is adapted to admit cooling water to the piston 8. The stem 13 is provided with a passage 16 which communicates with a cooling water supply and extends downwardly through the stem into the piston 8. The annular space within the stem 13 around the passage 16 communicates with a water overflow through piping 17. A piston 18 is rigidly secured to the stem 13 and operates within the cylinder of the dash pot 14. The head portion of the dash pot is provided with suitable packing 19, through which the stem 13 extends.

The operation of the engine is as follows: The charge is admitted to the engine cylinder during the suction stroke of the piston and is forced, during the compression stroke, into the end of the cylinder adjacent to the auxiliary piston 8. The auxiliary piston 8 is held in the forward end of the chamber 9, by the restraining fluid admitted through the port 10, until the compression pressure within the engine cylinder exceeds the restraining pressure. It is then moved by the impulse of the compression within the engine cylinder, to such a position in the chamber 9 that the pressures on both sides of it are equal. Under such conditions the ultimate compression will depend upon the relative volumes of the clearance space within the engine cylinder and of the chamber 9. It is apparent that the chamber 9 may be so designed that under the most extraordinary circumstances the compression will rise only a few pounds, or, if desired, only a fraction of a pound, above the ultimate compression under which the engine operates when delivering power equal to its normal rating. At the instant of firing the compressed charge, the pressure in the engine cylinder tends to pile up, due to the expansion of the gases, but, since the piston 8 was balanced at the end of the compression stroke it will readily respond to any increase of pressure in the engine cylinder and will recede toward the rear end of the chamber 9, thereby increasing the volume of the combustion chamber and causing the pressure in the engine cylinder to remain practically constant, or at the most, only increasing a relatively small amount above the compression pressure.

The port 10 in the chamber 9 is so arranged that a slight movement of the piston 8 will close it and for that reason the fluid behind the piston 8 is confined during the greater portion of the compression and firing stroke and consequently the piston 8, in moving backward into the chamber 9, compresses it. The ultimate pressure attained, both behind and in front of the piston 8, is dependent upon the relative volumes of the clearance space in the engine cylinder and of the chamber 9. These volumes may be so proportioned that almost any desired ultimate pressure may be obtained. As the engine piston moves forward under the impulse of the explosion pressure, the pressure in the cylinder tends to fall, but the piston 8, since it is balanced, responds to any decrease of pressure in the engine cylinder and moves forward under the impulse of the preponderating pressure in the cylinder 9 and therefore pays back to the engine cylinder, by maintaining a constant pressure in it, the energy utilized in compressing the confined restraining fluid.

Since the preponderating pressure in the chamber 9 would cause the piston 8 to be moved to the forward end of the chamber 9 at an objectionable velocity, I have provided dash pot 14, which operates to check the piston when it nears the ends of its stroke. The dash pot 14 is provided with a fluid by-pass 21, which is adapted to deliver the fluid leaking from the chamber 9 past the piston 18 into the cylindrical chamber of the dash pot behind the piston. The by-pass 21 also makes it possible, by equalizing the pressure on each side of the piston 18, for the piston 8 to move with great rapidity during the first part of its stroke and then to be positively checked by a fluid cushion. The by-pass 21 is so located that the pressures on each side of the piston 18 during a portion of its downward travel, are equal. After the piston 18 has closed the lower end of the by-pass the pressure below the piston at once starts to pile up and to check the downward movement of the piston 8.

The reducing valve 12 is provided in the piping 11 so that different pressures may be admitted to the chamber 9. Such an arrangement will admit of readily controlling the ultimate compression pressure obtainable within the engine cylinder and thereby will provide means for adjusting the engine to suit the various gases utilized. That is, the compression can be raised or lowered in accordance with the leanness or the richness of the gas utilized.

In Fig. 2 I have shown somewhat diagrammatically an arrangement whereby the explosion within the engine cylinder is effective in storing up the compressed supply of restrained fluid utilized in the cylinder 9 of the piston 8. In carrying out this arrangement I provide in the wall of the cylinder 9 a port 22 which is so located adjacent to the port 10 that it will be uncovered and exposed to the pressure within the engine cylinder. A pipe 23 communicates with the port 22 and a storage tank 24 and is provided with a spring restrained check valve 25 which will permit the delivery of fluid from the engine cylinder to the tank but will prevent a flow of fluid or a leakage of pressure in the opposite direction. The valve 25 is so regulated and adjusted by its spring that it will not deliver pressure from the engine cylinder to the tank until after a degree of pressure has been attained in the engine cylinder that will insure the delivery to the tank of consumed gases only. Such an arrangement will eliminate the danger of an explosion within the tank 24 or the connecting pipe.

The port 22 may be so located with reference to the piston 8 that it will not be uncovered by the piston until after explosion has taken place within the engine cylinder. Such an arrangement in connection with the valve 25 will doubly insure the delivery of consumed gases only to the tank 24. Other means may also be employed in connection with the valve 25 for preventing explosions within the tank if it is found necessary to do so.

When the engine cylinder is provided with the adjustable combustion chamber and the automatically actuated piston 8, it is apparent that the ultimate pressure in the engine cylinder is limited. It is moreover apparent that the firing pressure within the cylinder, instead of delivering to the engine cylinder and its coöperating parts an exceedingly high pressure, is limited to some predetermined pressure which acts upon the engine piston throughout the greater portion of the firing stroke.

The ordinary gas engines in which the clearance space is fixed, are subjected during their operation to variable compression, and consequently to variable explosion pressures. The limited space in which the gas is confined at the time of explosion causes an exceedingly high pressure within the cylinder and consequently the parts must be designed to resist the extreme stresses encountered at the time of explosion.

Engines employing variable combustion chambers operate under a substantially constant pressure for all loads and also a constant explosion pressure. The volume of the explosion chamber increases in accordance with the expansion of the gas at the time of explosion and consequently the ultimate explosion pressure is low and limited to some safe predetermined pressure. The energy utilized in increasing the size of the combustion chamber is paid back to the engine cylinder by maintaining throughout the firing stroke or the major portion of it a pressure within the engine cylinder which is substantially equal to the pressure to which the power delivering parts were subjected at the time of firing the charge; consequently the parts, instead of being designed to resist an extreme stress which exists for an exceedingly short time, are designed to resist a safe predetermined stress which exists for a longer time; consequently an engine equipped with my invention may be made much lighter, and therefore is cheaper than an ordinary engine of the same horse power.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim and desire to secure by Letters Patent is:

1. In an internal combustion engine, the combination with a cylinder and its piston of a supplemental reciprocable piston subjected to the fluid pressure within the cylinder, means for admitting fluid pressure behind said supplemental piston to oppose the pressure within said cylinder and means whereby the fluid pressure behind said piston is maintained substantially constant throughout a portion of the stroke of said supplemental piston and then is caused to rapidly increase.

2. In an internal combustion engine, the combination with a cylinder and its piston of a supplemental reciprocable piston subjected to the fluid pressure within the cylinder, means for admitting fluid pressure behind said supplemental piston to oppose the pressure within said cylinder, means whereby the fluid pressure behind said piston is maintained substantially constant throughout a portion of the stroke of said supplemental piston and then is caused to rapidly increase and means for checking the motion of said piston near the end of its stroke.

3. In an internal combustion engine, the combination with a cylinder and its piston of a supplemental reciprocable piston subjected to the fluid pressure within the cylinder, means for admitting fluid pressure behind said supplemental piston to oppose the pressure within said cylinder, means whereby the fluid pressure behind said piston is maintained substantially constant throughout a portion of the stroke of said supplemental piston and then is caused to rapidly increase and a dash-pot for checking the motion of said piston near each end of its stroke.

4. In an internal combustion engine, the combination with a cylinder and its piston of a supplemental reciprocable piston subjected to the fluid pressure within the cylinder, means for admitting fluid pressure behind said supplemental piston to oppose the pressure within said cylinder, means whereby the fluid pressure behind said piston is maintained substantially constant throughout a portion of the stroke of said supplemental piston and then is caused to rapidly increase and means whereby said supplemental piston is caused to pump the opposing fluid pressure during its reciprocations.

5. In an internal combustion engine, the combination with a cylinder and its piston of a supplemental reciprocable piston subjected to the fluid pressure within said cylinder, a fluid supply tank adapted to deliver fluid pressure behind said piston to oppose the pressure within said cylinder and means whereby said piston is subjected to the pressure within said tank throughout a portion of its stroke only.

In testimony whereof, I have hereunto subscribed my name this 29th day of January, 1907.

GEO. WESTINGHOUSE.

Witnesses:
CHARLES W. McGHEE,
E. W. McCALLISTER.